US010005885B2

(12) United States Patent
Monsheimer et al.

(10) Patent No.: US 10,005,885 B2
(45) Date of Patent: Jun. 26, 2018

(54) POLYMER POWDER WITH POLYAMIDE, USE IN A SHAPING PROCESS, AND MOLDINGS PRODUCED FROM THIS POLYMER POWDER

(71) Applicants: Sylvia Monsheimer, Haltern am See (DE); Franz-Erich Baumann, Duelmen (DE); Maik Grebe, Bochum (DE)

(72) Inventors: Sylvia Monsheimer, Haltern am See (DE); Franz-Erich Baumann, Duelmen (DE); Maik Grebe, Bochum (DE)

(73) Assignee: Evonik Degussa GmbH, Essen (DE)

(*) Notice: Subject to any disclaimer, the term of this patent is extended or adjusted under 35 U.S.C. 154(b) by 286 days.

(21) Appl. No.: 14/475,746

(22) Filed: Sep. 3, 2014

(65) Prior Publication Data

US 2014/0371364 A1  Dec. 18, 2014

Related U.S. Application Data

(62) Division of application No. 11/596,365, filed as application No. PCT/EP2005/051289 on Mar. 21, 2005, now Pat. No. 8,865,053.

(30) Foreign Application Priority Data

May 14, 2004 (DE) .................. 10 2004 024 440

(51) Int. Cl.
  *C08G 69/08* (2006.01)
  *C08K 3/22* (2006.01)
  *C08K 5/098* (2006.01)
  *C08K 3/04* (2006.01)
  *B29C 67/00* (2017.01)
  *C08K 3/40* (2006.01)
  *C08J 3/14* (2006.01)
  *B29C 64/153* (2017.01)
  *B29K 77/00* (2006.01)
  *B29K 105/00* (2006.01)
  *B29K 105/16* (2006.01)
  *B29K 505/08* (2006.01)
  *B29K 507/04* (2006.01)
  *B29K 509/08* (2006.01)

(52) U.S. Cl.
  CPC ............ *C08G 69/08* (2013.01); *B29C 64/153* (2017.08); *C08J 3/14* (2013.01); *C08K 3/04* (2013.01); *C08K 3/22* (2013.01); *C08K 3/40* (2013.01); *C08K 5/098* (2013.01); *B29K 2077/00* (2013.01); *B29K 2105/0032* (2013.01); *B29K 2105/16* (2013.01); *B29K 2105/251* (2013.01); *B29K 2505/08* (2013.01); *B29K 2507/04* (2013.01); *B29K 2509/08* (2013.01); *C08J 2377/02* (2013.01); *C08K 2003/2241* (2013.01); *Y10T 428/2982* (2015.01)

(58) Field of Classification Search
  None
  See application file for complete search history.

(56) References Cited

U.S. PATENT DOCUMENTS

| 4,065,519 | A | 12/1977 | Koch |
| 4,248,977 | A | 2/1981 | Wertz et al. |
| 4,511,684 | A * | 4/1985 | Schmid ............. C08K 5/34928 524/101 |
| 4,711,925 | A * | 12/1987 | Mumcu ............. C08J 3/14 524/379 |
| 5,425,817 | A | 6/1995 | Mugge et al. |
| 5,527,877 | A | 6/1996 | Dickens, Jr. et al. |
| 5,648,450 | A * | 7/1997 | Dickens, Jr. ......... B29C 41/003 156/62.2 |
| 5,681,899 | A * | 10/1997 | Wang .................... C08L 21/00 524/81 |
| 5,733,497 | A | 3/1998 | McAlea et al. |
| 5,990,268 | A | 11/1999 | Dickens, Jr. et al. |
| 6,107,444 | A * | 8/2000 | Bruneau ................ B32B 27/20 528/176 |
| 6,136,948 | A | 10/2000 | Dickens, Jr. et al. |
| 6,243,616 | B1 | 6/2001 | Droscher et al. |
| 6,589,471 | B1 | 7/2003 | Khoshnevis |
| 6,884,485 | B2 | 4/2005 | Baumann et al. |
| 7,005,481 | B1 * | 2/2006 | Lehmann ............ C08G 69/04 525/420 |
| 7,135,525 | B2 | 11/2006 | Petter et al. |
| 7,148,286 | B2 | 12/2006 | Bauman et al. |
| 7,211,615 | B2 | 5/2007 | Baumann et al. |
| 7,317,044 | B2 | 1/2008 | Monsheimer et al. |
| 8,119,715 | B2 | 2/2012 | Monsheimer et al. |
| 2004/0030023 | A1 * | 2/2004 | Buhler ................. C08G 69/04 524/445 |
| 2004/0087706 | A1 * | 5/2004 | Fish, Jr. ............... C08L 77/00 524/494 |
| 2004/0102539 | A1 | 5/2004 | Monsheimer et al. |
| 2004/0106691 | A1 | 6/2004 | Monsheimer et al. |
| 2004/0137228 | A1 | 7/2004 | Monsheimer et al. |
| 2004/0138344 | A1 | 7/2004 | Allen et al. |
| 2004/0138363 | A1 | 7/2004 | Baumann et al. |
| 2004/0232583 | A1 * | 11/2004 | Monsheimer ....... B29C 67/0077 264/113 |
| 2005/0014842 | A1 | 1/2005 | Baumann et al. |

(Continued)

FOREIGN PATENT DOCUMENTS

| DE | 101 22 492 | 11/2002 |
| DE | 103 11 446 | 4/2004 |

(Continued)

*Primary Examiner* — Ronak Patel
(74) *Attorney, Agent, or Firm* — Oblon, McClelland, Maier & Neustadt, L.L.P.

(57) ABSTRACT

The present invention relates to a polymer powder which comprises nylon-11, and to the use of this powder for shaping processes, and also to moldings produced from this polymer powder. The moldings constructed using the inventive powder exhibit marked advantages in terms of component properties, particularly surface finish. There are also improvements here in processing and in recycling capability when comparison is made with conventional polyamide powders.

23 Claims, No Drawings

(56) References Cited

U.S. PATENT DOCUMENTS

| | | |
|---|---|---|
| 2005/0027047 A1 | 2/2005 | Monsheimer et al. |
| 2005/0027050 A1 | 2/2005 | Monsheimer et al. |
| 2005/0038201 A1 | 2/2005 | Wursche et al. |
| 2005/0239674 A1* | 10/2005 | Dreja ............... C11D 3/124 510/180 |
| 2006/0071359 A1 | 4/2006 | Monsheimer et al. |
| 2006/0134419 A1 | 6/2006 | Monsheimer et al. |
| 2006/0182916 A1 | 8/2006 | Dowe et al. |
| 2006/0183869 A1 | 8/2006 | Dowe et al. |
| 2006/0189784 A1 | 8/2006 | Monsheimer et al. |
| 2006/0202395 A1 | 9/2006 | Monsheimer et al. |
| 2006/0223928 A1 | 10/2006 | Monsheimer et al. |
| 2006/0244169 A1 | 11/2006 | Monsheimer et al. |
| 2006/0246287 A1* | 11/2006 | Gersch ................. C08J 3/12 428/402 |
| 2006/0281873 A1 | 12/2006 | Alting et al. |
| 2007/0055044 A1 | 3/2007 | Simon et al. |
| 2007/0104971 A1 | 5/2007 | Wursche et al. |
| 2007/0166560 A1 | 7/2007 | Wursche et al. |
| 2007/0260014 A1 | 11/2007 | Simon et al. |
| 2008/0119632 A1 | 5/2008 | Baumann et al. |
| 2008/0166529 A1 | 7/2008 | Hager et al. |
| 2008/0213552 A1 | 9/2008 | Hager et al. |
| 2008/0217821 A1 | 9/2008 | Goring et al. |
| 2008/0242782 A1 | 10/2008 | Hager et al. |
| 2008/0249237 A1 | 10/2008 | Hager et al. |
| 2009/0088508 A1 | 4/2009 | Monsheimer et al. |
| 2011/0130515 A1 | 6/2011 | Monsheimer et al. |
| 2012/0041132 A1 | 2/2012 | Monsheimer et al. |

FOREIGN PATENT DOCUMENTS

| | | |
|---|---|---|
| DE | 103 34 496 | 2/2005 |
| DE | 10 2004 009 234 | 9/2005 |
| DE | 603 03 275 | 10/2006 |
| DE | 197 47 309 | 11/2007 |
| EP | 1 015 214 | 7/2000 |
| EP | 1 413 595 | 4/2004 |
| WO | WO 95/11006 | 4/1995 |
| WO | 96 06881 | 3/1996 |
| WO | WO 98/51464 | 11/1998 |
| WO | WO 01/38061 | 5/2001 |

* cited by examiner

POLYMER POWDER WITH POLYAMIDE, USE IN A SHAPING PROCESS, AND MOLDINGS PRODUCED FROM THIS POLYMER POWDER

RELATED APPLICATIONS

This application is a divisional of U.S. application Ser. No. 11/596,365, filed Oct. 4, 2007, which is the National Stage of International Application No. PCT/EP05/51289, filed Mar. 21, 2005, which claimed priority to German Patent Application No. 102004024440.5, filed May 14, 2004; of which all of the disclosures are incorporated herein by reference in their entireties.

The rapid production of prototypes is a task often required in very recent times. Particularly suitable processes are those whose operation is based on pulverulent materials, and which produce the desired structures layer-by-layer via selective melting and hardening. Support structures for overhangs and undercuts can be omitted here, because the powder bed surrounding the molten regions provides adequate support. Nor is there any need for subsequent operations to remove supports. These processes are also suitable for short-run production.

The invention relates to a polymer powder based on a nylon-11, preferably prepared via polycondensation of ω-aminoundecanoic acid, to the use of this powder in shaping processes, and also to moldings produced via a layer-by-layer process which selectively melts regions of a pulverulent layer, using this powder. After cooling and hardening of the regions previously subjected to layer-by-layer melting, the molding can be removed from the powder bed.

By way of example, the selectivity of the layer-by-layer process may be achieved by way of the application of susceptors, absorbers, inhibitors, or masks, or by way of focused introduction of energy, for example via a laser beam or by way of glass fibers. The introduction of energy is achieved by way of electromagnetic radiation.

Descriptions are given below of some processes which can produce inventive moldings from the inventive powder, but there is no intention to restrict the invention thereto.

One process with particularly good suitability for rapid prototyping purposes is selective laser sintering. This process selectively and briefly irradiates plastics powders in a chamber with a laser beam, the result being that the powder particles impacted by the laser beam melt. The molten particles coalesce and rapidly solidify again to give a solid mass. This process can produce three-dimensional bodies simply and rapidly via repeated irradiation of a succession of freshly applied layers.

The patent specifications U.S. Pat. No. 6,136,948 and WO 96/06881 (both DTM Corporation) give a detailed description of the laser-sintering (rapid prototyping) process for producing moldings from pulverulent polymers. A wide variety of polymers and copolymers is claimed for this application, e.g. polyacetate, polypropylene, poly-ethylene, ionomers, and polyamide.

Other processes with good suitability are the SIB process described in WO 01/38061, or a process described in EP 1 015 214. Both processes operate with full-surface infrared heating to melt the powder. The selectivity of melting is achieved in the first process via the application of an inhibitor, and in the second process via a mask. DE 103 11 438 describes another process. In this, the energy needed for the melting process is introduced via a microwave generator, and the selectivity is achieved via application of a susceptor.

For the rapid prototyping or rapid manufacturing processes (RP or RM processes) mentioned use may be made of pulverulent substrates, in particular polymers, preferably selected from polyester, polyvinyl chloride, polyacetal, polypropylene, polyethylene, polystyrene, polycarbonate, poly(N-methylmethacrylimides) (PMMI), polymethyl methacrylate (PMMA), ionomer, polyamide, or a mixture of these.

WO 95/11006 describes a polymer powder suitable for laser sintering and showing no overlap of the melting and recrystallization peak during determination of melting behavior via differential scanning calorimetry at a scanning rate of 10-20° C./min, and having a degree of crystallinity of 10-90%, likewise determined via DSC, and having a number-average molecular weight Mn of from 30 000 to 500 000 and an Mw/Mn quotient in the range from 1 to 5.

DE 197 47 309 describes the use of a nylon-12 powder with an elevated melting point and an increased enthalpy of fusion, obtained via reprecipitation of a polyamide previously prepared via ring-opening and subsequent polycondensation of laurolactam. This is a nylon-12. A disadvantage of this powder is relatively high BET surface area, mostly above 6 $m^2$/g, resulting firstly in an increased requirement for powder-flow aid, in turn reducing processing latitude, i.e. the temperature range at whose lower limit curl just ceases and at whose upper limit full-surface melting of the pulverulent layer is just avoided. Secondly, the high BET surface area impairs the recycling capability of the powder not melted in the first pass. A lower BET surface area would be obtained by preparing a coarser-grain material, but this would adversely affect the resolution achievable on the component in the powder-based processes.

A disadvantage of processing by means of one of the shaping processes described above is that, in order to avoid what is known as curl, the temperature in the construction chamber has to be kept with maximum uniformity to a level just below the melting point of the polymeric material. Curl means distortion of the previously molten region, causing at least some protrusion from the plane of construction. Associated with this is the risk that when the next pulverulent layer is applied the protruding regions may be shifted or even entirely broken away. The consequence of this in relation to the process is that the overall construction space temperature has to be kept at a relatively high level. For sharp separation of the regions into which the electromagnetic energy has been introduced from those not intended for melting, maximum enthalpy of fusion is desirable, giving a sharp DSC (differential scanning calorimetry to DIN 53765) peak. Conduction of heat and radiation of heat from the molten region, which of course cannot be prevented, also brings about relatively severe deviation of the molding from the intended contours. Maximum enthalpy of fusion of the powder inhibits sintering of the powder bed onto the molten region.

It was therefore an object of the present invention to provide a polymer powder which permits the production of moldings with maximum surface quality and maximum dimensional accuracy. The processing latitude here is sufficiently great to avoid any need to operate at the upper or lower limit, while at the same time retaining the grain sizes of the standard powders currently marketed. The process here is a layer-by-layer process in which regions of the respective pulverulent layer are selectively melted by means of electromagnetic energy and, after cooling, have become bonded to give the desired molding.

Surprisingly, it has now been found, as described in the claims, that the use of nylon-11 can, via precipitative crystallization, prepare polymer powders from which it is possible, via a layer-by-layer process in which regions of the respective pulverulent layer are selectively melted, to produce moldings which have advantages in terms of surface quality and dimensional accuracy, while their processing properties are better than those obtained from a polymer powder of the prior art, for example as in DE 197 47 309.

The present invention therefore provides a polymer powder for processing in a layer-by-layer process in which regions of the respective layer are selectively melted, which comprises at least one nylon-11, preferably a nylon-11 prepared via polycondensation of ω-aminoundecanoic acid. This inventive polymer powder has an enthalpy of fusion, determined by means of DSC, of at least 125 J/g, and a recrystallization temperature of at least 148° C., preferably an enthalpy of fusion of at least 130 J/g and a recrystallization temperature of at least 150° C., and particularly preferably an enthalpy of fusion of at least 130 J/g and a recrystallization temperature of at least 151° C. The BET surface area of the inventive nylon-11 powder is smaller than 6 m$^2$/g, preferably smaller than 5 m$^2$/g, and particularly preferably smaller than 4 m$^2$/g, and the median grain diameter is preferably from 40 to 120 µm, preferably from 45 to 100 µm, and particularly preferably from 50 to 70 µm.

The BET surface area is determined via gas adsorption using the Brunauer, Emmet and Teller principle; the standard utilized is DIN/ISO 9277 66333.

The present invention also provides moldings produced via a layer-by-layer process which selectively melts regions of the respective layer, which comprise at least nylon-11, preferably a nylon-11 prepared by polycondensation of ω-aminoundecanoic acid, and, if appropriate, further additives, such as stabilizers, fillers, pigments, flow promoters and powder-flow aids.

An advantage of the inventive polymer powder is that moldings produced therefrom via a layer-by-layer process in which regions of the respective layer are selectively melted have better dimensional accuracy and better surface quality when compared with moldings composed of conventional polyamide powders. This inventive powder has greater processing latitude and better recycling capability than conventional polyamide powder.

The mechanical properties of moldings produced from the inventive powder are good and similar to those of the moldings produced from conventional powder.

The inventive polymer powder is described below, but there is no intention to restrict the invention to this description.

The inventive polymer powder for processing in a layer-by-layer process in which regions of the respective layer are selectively melted comprises at least nylon-11.

By way of example, inventive powder is obtained via a process as in DE 29 06 647 B1 or via DE 197 08 146, but using nylon-11 pellets as starting material. The polyamide is dissolved in ethanol and is crystallized under certain conditions. This gives a powder unlike ground powders and having relatively round grains. If appropriate, the material is subjected to precautionary sieving and further classification or low-temperature milling. The person skilled in the art can readily establish the conditions via exploratory preliminary experiments.

Surprisingly, it has been found that the advantageous properties described in DE 197 47 309 for the polyamide powder, namely high enthalpy of fusion, can be established much more advantageously if use is made of a nylon-11. A low BET surface area can then moreover also be obtained together with a low median particle diameter.

Unlike in DE 197 47 309 A1, a high recrystallization temperature is also advantageous, firstly because good processing latitude is retained, due to the high melting point of the precipitated nylon-11 powder, but secondly because there is a marked improvement in the recycling capability of the material: if recrystallization temperature is high, powder which has not been melted during a construction process can be reused in a more advantageous ratio with virgin material, without adversely affecting surface properties.

The inventive polymer powder therefore has an enthalpy of fusion determined by means of DSC of at least 125 J/g and a recrystallization temperature of at least 148° C., preferably an enthalpy of fusion of at least 130 J/g and a recrystallization temperature of at least 150° C., and particularly preferably an enthalpy of fusion of at least 130 J/g and a recrystallization temperature of at least 151° C. The BET surface area of the inventive nylon-11 is smaller than 6 m$^2$/g, preferably smaller than 5 m$^2$/g, and particularly preferably smaller than 4 m$^2$/g, and the median grain diameter is preferably from 40 to 120 µm, and preferably from 45 to 100 µm, and particularly preferably from 50 to 70 µm.

The various parameters were determined by means of DSC (differential scanning calorimetry) to DIN 53765, or to AN-SAA 0663. The measurements were made using a Perkin Elmer DSC 7 with nitrogen as flushing gas and with a heating rate and cooling rate of 20 K/min. The range of measurement was from −90 to +250° C.

The solution viscosity to DIN 53727 of the inventive polyamide powders in 0.5% strength m-cresol solution is preferably from 1.4 to 2.1, particularly preferably from 1.5 to 1.9, and very particularly preferably from 1.6 to 1.7.

The polyamide may be unregulated, partially regulated, or regulated. The regulation may apply either to the amino end group or to the acid end group, and may be mono-, di- or polyfunctional. Examples of suitable regulators are alcohols, amines, esters, or carboxylic acids. Mono-, di-, or polyamines or -carboxylic acids are used as regulators. Preference is given to the use of an unregulated or amine-regulated material, where, during the construction process, this material brings about good flow of the molten particles, and also good mechanical properties in the finished component.

The pellets used as starting material for processing to give inventive powders are marketed, by way of example, by Elf Atochem, France (Rilsan, nylon-11). An example of a suitable material for use is RILSAN BMNO TL, with rel. solution viscosity of 1.61.

Inventive polymer powder may also comprise auxiliaries and/or filler and/or other organic or inorganic pigments. Examples of these auxiliaries may be powder-flow aids, e.g. precipitated and/or fumed silicas. Examples of precipitated silicas are marketed with the product name Aerosil with various specifications by Degussa AG. Inventive polymer powder preferably comprises less than 3% by weight, preferably from 0.001 to 2% by weight, and very particularly preferably from 0.05 to 1% by weight, of these auxiliaries, based on the entirety of the polymers present. By way of example, the fillers may be glass particles, metal particles, or ceramic particles, e.g. glass beads, steel shot, or granulated metal, or pigments of other materials, e.g. transition metal oxides. By way of example, the pigments may be titanium dioxide particles based on rutile (preferred) or anatase, or carbon black particles.

The median particle size of the filler particles is preferably smaller than or approximately equal to that of the particles of the polyamides. The amount by which the median particle size $d_{50}$ of the fillers exceeds the median particle size $d_{50}$ of the polyamides is preferably not more than 20%, preferably not more than 15%, and very particularly preferably not more than 5%. A particular limitation on the particle size is the permissible overall height and, respectively, layer thickness in the rapid prototyping/rapid manufacturing system.

Inventive polymer powder preferably comprises less than 75% by weight, preferably from 0.001 to 70% by weight, particularly preferably from 0.05 to 50% by weight, and very particularly preferably from 0.5 to 25% by weight, of these fillers, based on the entirety of polyamides present.

If the stated maximum limits for auxiliaries and/or fillers are exceeded, depending on the filler or auxiliary used, the result can be marked impairment of the mechanical properties of the moldings produced using these polymer powders.

It is also possible to mix conventional polymer powders with inventive polymer powders. This method can produce polymer powders with a different combination of surface properties. The process for preparing these mixtures may be found in DE 34 41 708, for example.

To improve melt flow during the production of the moldings, use may be made of a flow promoter, such as metal soaps, preferably the alkali metal or alkaline earth metal salts of the underlying alkanemono-carboxylic acids or dimer acids, added to the precipitated polyamide powder. The metal soap particles may be incorporated into the polymer particles, or else mixtures of fine metal soap particles and polymer particles may be used.

The amounts used of the metal soaps are from 0.01 to 30% by weight, preferably from 0.5 to 15% by weight, based on the entirety of polyamides present in the powder. Preferred metal soaps used were the sodium or calcium salts of the underlying alkanemonocarboxylic acids or dimer acids. Examples of commercially available products are Licomont NaV 101 or Licomont CaV 102 from Clariant.

To improve processability, or for further modification of the polymer powder, inorganic pigments composed of other materials, e.g. transition metal oxides, stabilizers, e.g. phenols, in particular sterically hindered phenols, flow promoters and powder-flow aids, e.g. fumed silicas, or else filler particles may be added. The amount of these substances added to the polymers, based on the total weight of polymers in the polymer powder, preferably complies with the stated concentrations for fillers and/or auxiliaries for the inventive polymer powder.

The present invention also provides a process for the production of moldings via layer-by-layer processes in which regions of the respective layer are selectively melted and in which use is made of inventive polymer powders which comprise at least one nylon-11 whose enthalpy of fusion is at least 125 J/g and whose recrystallization temperature is at least 148° C., preferably prepared via polycondensation of co-amino-undecanoic acid.

The energy is introduced via electromagnetic radiation, and the selectivity is achieved, by way of example, via masks, application of inhibitors, of absorbers, or of susceptors, or else via focusing of the radiation, for example via lasers. The electromagnetic radiation encompasses the range from 100 nm to 10 cm, preferably from 400 nm to 10 600 nm or from 800 to 1060 nm. The source of the radiation may be, by way of example, a microwave generator, a suitable laser, a radiative heater, or a lamp, or else a combination thereof. Once all of the layers have been cooled, the inventive molding can be removed.

The examples below of these processes serve for illustration, but there is no intention that the invention be restricted thereto.

Laser sintering processes are well-known and are based on the selective sintering of polymer particles, layers of polymer particles being exposed briefly to laser light, thus causing bonding between the polymer particles exposed to the laser light. Three-dimensional objects are produced by sequential sintering of layers of polymer particles. Details concerning the selective laser sintering process are found by way of example in the specifications U.S. Pat. No. 6,136,948 and WO 96/06881.

Other processes with good suitability are the SIB process described in WO 01/38061, or a process described in EP 1 015 214. Both processes operate with full-surface infrared heating to melt the powder. The selectivity of melting is achieved in the first process via the application of an inhibitor, and in the second process via a mask. DE 103 11 438 describes another process. In this, the energy needed for the melting process is introduced via a microwave generator, and the selectivity is achieved via application of a susceptor.

The inventive moldings produced via a layer-by-layer process in which regions are selectively melted comprise at least one nylon-11 whose enthalpy of fusion is at least 125 J/g and whose recrystallization temperature is at least 148° C., preferably prepared via polycondensation of ω-aminoundecanoic acid.

The moldings may also comprise fillers and/or auxiliaries (the data for the polymer powder likewise apply here), e.g. heat stabilizers, e.g. sterically hindered phenol derivatives. Examples of fillers may be glass particles, ceramic particles, or else metal particles, e.g. iron shot, or appropriate hollow beads.

The inventive moldings preferably comprise glass particles, very particularly preferably glass beads. Inventive moldings preferably comprise less than 3% by weight, preferably from 0.001 to 2% by weight, and very particularly preferably from 0.05 to 1% by weight, of these auxiliaries, based on the entirety of polymers present. Inventive moldings likewise preferably comprise less than 75% by weight, preferably from 0.001 to 70% by weight, particularly preferably from 0.05 to 50% by weight, and very particularly preferably from 0.5 to 25% by weight, of these fillers, based on the entirety of polymers present.

The examples below are intended to describe the inventive polymer powder and its use, without restricting the invention to the examples.

The laser scattering values measured were obtained using a Malvern Mastersizer S, version 2.18.

COMPARATIVE EXAMPLE 1

Reprecipitation of Nylon-12 (PA 12)
(Non-Inventive)

400 kg of unregulated PA 12 prepared by hydrolytic polymerization and having a relative solution viscosity of 1.62 and an end group content of 75 mmol/kg of COOH and 69 mmol/kg of $NH_2$ are heated to 145° C. with 2500 l of ethanol denatured with 2-butanone and 1% water content within a period of 5 hours in a 3 $m^3$ stirred tank (d=160 cm) and kept at this temperature for one hour with stirring (blade stirrer, d=80 cm, rotation rate=49 rpm). The jacket temperature is then reduced to 124° C., and the internal temperature is brought to 125° C. using a cooling rate of 25 K/h with the same stirrer rotation rate, while ethanol is continuously removed by distillation. From now on, using the same cooling rate, the jacket temperature is kept below the internal temperature by from 2 to 3 K. The internal temperature is brought to 117° C., at the same cooling rate, and then kept constant for 60 minutes. The internal temperature is then brought to 111° C., at a cooling rate of 40 K/h with further removal of material by distillation. At this temperature precipitation begins, detectable via heat generation. The distillation rate is increased to an extent that keeps the internal temperature at not above 111.3° C. After 25 minutes, the internal temperature falls, indicating the end of the precipitation process. The temperature of the suspension is brought to 45° C. via further removal of material by distillation and cooling by way of the jacket, and then the suspension is transferred to a paddle dryer. The ethanol is distilled off from the mixture at 70° C./400 mbar until the internal temperature approaches the jacket temperature, and the residue is then further dried for 3 hours at 20 mbar/86° C.

This gives a precipitated PA 12 with a median grain diameter of 55 µm. The bulk density was 435 g/l.

A powder composed of PA 11 is prepared by a method similar to the procedure set out in example 1, or according to DE 19708146.

COMPARATIVE EXAMPLE 2

Low-Temperature-Milled Powder Based on PA 11 (Non-Inventive)

PA 11 pellets see example 1 with a rel. solution viscosity of 1.61 and an end group content of 125 mmol/kg of COOH and 9 mmol/kg of $NH_2$ are milled in a pinned disc mill at −35° C. to give a powder with the following properties:

D(10%)=34 µm D(50%)=88 µm D(90%)=136 µm BET=0.34 $m^2$/g bulk density 476 g/l

INVENTIVE EXAMPLE 3

Reprecipitation of Carboxy-Terminated Nylon-11 (PA 11) (Inventive)

4.0 kg of carboxy-terminated PA 11 prepared via polycondensation of 50 kg of ω-aminoundecanoic acid in the presence of 450 g of dodecanedioic acid and having a relative solution viscosity of 1.61 and an end group content of 125 mmol/kg of COOH and 9 mmol/kg of $NH_2$ are heated to 152° C. with 20 l of ethanol denatured with 2-butanone and 1% water content within a period of 5 hours in a 40 l stirred tank (D=40 cm), with stirring, and kept at this temperature for 1 hour (blade stirrer, d=30 cm, rotation rate=89 rpm). The jacket temperature is then reduced to 120° C., and the internal temperature is brought to 125° C. using a cooling rate of 25 K/h with the same stirrer rotation rate. From now on, using the same cooling rate, the jacket temperature is kept below the internal temperature by from 2 to 3 K. The internal temperature is brought to 112° C., at the same cooling rate, and then kept constant for 60 minutes. At this temperature precipitation begins, detectable via heat generation. After 25 minutes, the internal temperature falls, indicating the end of the precipitation process. Stirring is continued for a further 35 min at this temperature, and the mixture is then cooled to 75° C., and then the suspension is transferred to a paddle dryer. The ethanol is distilled off from the mixture at 70° C./400 mbar until the internal temperature approaches the jacket temperature, and the residue is then further dried for 3 hours at 20 bar/86° C.

Bulk density 481 g/l. BET: 1.63 $m^2$/g D(10%)=75 µm D(50%)=127 µm D(90%)=200 µm

INVENTIVE EXAMPLE 4

Reprecipitation of Amine-Terminated Nylon-11 (PA 11) (Inventive)

4.0 kg of diamine-terminated PA 11 prepared via polymerization of 50 kg of ω-aminoundecanoic acid in the presence of 250 g of 4,4'-diaminocyclohexylmethane (PACM, isomer mixture) and having a relative solution viscosity of 1.82 and an end group content of 15 mmol/kg of COOH and 87 mmol/kg of $NH_2$ are heated to 152° C. with 20 l of ethanol denatured with 2-butanone and 1% water content within a period of 5 hours in a 40 l stirred tank (D=40 cm) and with stirring, and kept at this temperature for 1 hour (blade stirrer, d=30 cm, rotation rate=89 rpm). The jacket temperature is then reduced to 120° C., and the internal temperature is brought to 125° C. using a cooling rate of 25 K/h with the same stirrer rotation rate. From now on, using the same cooling rate, the jacket temperature is kept below the internal temperature by from 2 to 3 K. The internal temperature is brought to 112° C., at the same cooling rate, and then kept constant to within ±0.5° C. for 60 minutes. At this temperature precipitation begins, detectable via heat generation. After 30 minutes, the internal temperature falls, indicating the end of the precipitation process. Stirring is continued for a further 30 min at this temperature, and the mixture is then cooled to 75° C., and then the suspension is transferred to a paddle dryer. The ethanol is distilled off from the mixture at 70° C./400 mbar, and the residue is then further dried for 3 hours at 20 bar/84° C.

Bulk density 486 g/l. BET: 0.31 $m^2$/g D(10%)=66 µm D(50%)=110 µm D(90%)=162 µm

INVENTIVE EXAMPLES 5 AND 6

Reprecipitation of Amine-Terminated Nylon-11 (PA 11) (Inventive)

Example 3 is repeated with a stirrer rotation rate of 120 rpm (inventive example 5) or 150 rpm (inventive example 6), giving the following precipitated powders:

INVENTIVE EXAMPLE 5

Bulk density 391 g/l. BET: 4.80 $m^2$/g D(10%)=44 µm D(50%)=59 µm D(90%)=84 µm

INVENTIVE EXAMPLE 6

Bulk density 366 g/l. BET: 4.70 $m^2$/g D(10%)=28 µm D(50%)=37 µm D(90%)=51 µm

INVENTIVE EXAMPLE 7

Two-Stage Reprecipitation of Amine-Terminated Nylon-11 (Inventive)

4.0 kg of diamine-terminated PA 11 from inventive example 3 are heated to 152° C. with 20 l of ethanol denatured with 2-butanone and 1% water content within a period of 5 hours in a 40 l stirred tank (D=40 cm), with stirring, and kept at this temperature for 1 hour (blade stirrer, d=30 cm, rotation rate=120 rpm). The jacket temperature is then reduced to 120° C., and the internal temperature is brought to 125° C. using a cooling rate of 25 K/h with the same stirrer rotation rate. The internal temperature is then kept constant for 30 minutes. The internal temperature is brought to 112° C., at the same cooling rate, and then kept constant for 60 minutes. At this temperature precipitation begins, detectable via heat generation. After 35 minutes, the internal temperature falls, indicating the end of the precipitation process. Stirring is continued for a further 25 min at this temperature, and the mixture is then cooled to 75° C., and then the suspension is transferred to a paddle dryer. The ethanol is distilled off from the mixture at 70° C./400 mbar, and the residue is then further dried for 3 hours at 20 bar/85° C.

Bulk density 483 g/l. BET: 0.28 m²/g D(10%)=42 μm D(50%)=82 μm D(90%)=127 μm

INVENTIVE EXAMPLE 8

Reprecipitation of Unregulated Nylon-11 (PA 11) (Inventive)

4.0 kg of unregulated PA 11 prepared via polycondensation of 50 kg of ω-aminoundecanoic acid in the absence of an end-group regulator and having a relative solution viscosity of 1.59 and an end group content of 69 mmol/kg of COOH and 66 mmol/kg of NH$_2$ are dissolved at 152° C. with 20 l of ethanol denatured with 2-butanone and 1% water content, under the conditions of inventive example 2, and precipitated at 112.5° C. The ethanol is removed by distillation at 70° C./400 mbar, and the residue is then further dried for 3 hours in the manner described at 20 bar/85° C.

Bulk density 487 g/l. BET: 1.51 m²/g D(10%)=71 μm D(50%)=122 μm D(90%)=191 μm

|  | BET surface area [m²/g] | Median grain diameter [μm] | Melting point ° C. | Enthalpy of fusion [J/g] | Recrystallization temperature [° C.] |
|---|---|---|---|---|---|
| Comparative example 1 non-inventive | 6.3 | 55 | 186 | 112 | 141 |
| Comparative example 2 non-inventive | 0.34 | 88 | 191 | 87 | 157 |
| Inv. Ex. 3 | 1.63 | 127 | 191 | 132 | 150 |
| Inv. Ex. 4 | 0.31 | 110 | 191 | 139 | 154 |
| Inv. Ex. 5 | 4.8 | 59 | 193 | 129 | 151 |
| Inv. Ex. 6 | 4.7 | 37 | 192 | 126 | 151 |
| Inv. Ex. 7 | 0.28 | 82 | 192 | 133 | 152 |
| Inv. Ex. 8 | 1.51 | 122 | 191 | 136 | 152 |

The examples very clearly show that the inventive polyamide powder has markedly higher enthalpy of fusion and also higher recrystallization temperature than conventional polymer powders. Components with higher surface quality can therefore be produced, because less powder adheres to the molten regions. BET surface area is also lower, together with the fine median grain diameter. The recycling capability of the inventive powder is therefore likewise improved in comparison with conventional polyamide powders.

What is claimed is:

1. A polymer powder for use in a layer-by-layer process in which regions of a respective pulverulent layer are selectively melted via introduction of electromagnetic energy,
wherein the polymer powder comprises at least one nylon-11 having an enthalpy of fusion of at least 125 J/g and a recrystallization temperature of at least 148° C., and wherein the polymer powder has a BET surface area smaller than 6 m²/g and a median grain diameter of from 40 to 120 μm.

2. The polymer powder of claim 1, which comprises at least one nylon-11 having an enthalpy of fusion of at least 130 J/g and a recrystallization temperature of at least 150° C.

3. The polymer powder of claim 1, which has a BET surface area smaller than 5 m²/g and a median grain diameter of from 45 to 100 μm.

4. The polymer powder of claim 1, which has a BET surface area smaller than 5 m²/g and a median grain diameter of from 50 to 70 μm.

5. The polymer powder of claim 1, wherein the selectivity is achieved by application of at least one component selected from the group consisting of a susceptor, inhibitor, absorber, and mask,
wherein the polymer powder has a BET surface area smaller than 5 m²/g and a median grain diameter of from 50 to 70 μm.

6. The polymer powder of claim 1, wherein the selectivity is achieved by focusing a laser beam,
wherein the polymer powder has a BET surface area smaller than 5 m²/g and a median grain diameter of from 50 to 70 μm.

7. The polymer powder of claim 1, which comprises at least nylon-11 prepared by polycondensation of at least one one ω-aminoundecanoic acid.

8. The polymer powder of claim 1, wherein the polymer powder has been obtained by precipitative crystallization.

9. The polymer powder of claim 1, which comprises an unregulated nylon-11.

10. The polymer powder of claim 1, which comprises nylon-11 regulated by a regulator.

11. The polymer powder of claim 10, wherein the regulator comprises a monoamine, diamine or polyamine.

12. The polymer powder of claim 1, wherein the polymer powder is a polyamide powder having a solution viscosity of from 1.4 to 2.1.

13. The polymer powder of claim 1, wherein the polymer powder is a polyamide powder having a solution viscosity of from 1.5 to 1.9.

14. The polymer powder of claim 1, wherein the polymer powder is a polyamide powder having a solution viscosity of from 1.6 to 1.7.

15. The polymer powder of claim 10, wherein the regulator comprises a monocarboxylic acid, dicarboxylic acid or polycarboxylic acid.

16. The polymer powder of claim 1, which comprises nylon-11 partially regulated by a regulator.

17. The polymer powder of claim 1, which further comprises an auxiliary, filler, or a mixture thereof.

18. The polymer powder of claim 17, which comprises a powder-flow aid as the auxiliary.

19. The polymer powder of claim 17, which comprises glass particles as the filler.

20. The polymer powder of claim 17, which comprises a metal soap as the auxiliary.

21. The polymer powder of claim 1, further comprising an organic, an inorganic pigment, or a mixture thereof.

22. The polymer powder of claim 21, which comprises a carbon black.

23. The polymer powder of claim 21, which comprises a titanium dioxide.

* * * * *